(12) United States Patent
Anegawa et al.

(10) Patent No.: US 9,753,952 B2
(45) Date of Patent: Sep. 5, 2017

(54) IMAGE INFORMATION MANAGEMENT SYSTEM AND METHOD THEREOF, AND IMAGE INFORMATION SEARCH SYSTEM

(71) Applicant: DAI NIPPON PRINTING CO., LTD., Tokyo (JP)

(72) Inventors: Takehiko Anegawa, Tokyo-to (JP); Yoshihiro Yano, Tokyo-to (JP)

(73) Assignee: DAI NIPPON PRINTING CO., LTD., Tokyo-to (JP)

(*) Notice: Subject to any disclaimer, the term of this patent is extended or adjusted under 35 U.S.C. 154(b) by 0 days.

(21) Appl. No.: 14/467,484

(22) Filed: Aug. 25, 2014

(65) Prior Publication Data
US 2014/0362216 A1 Dec. 11, 2014

Related U.S. Application Data

(62) Division of application No. 11/721,839, filed as application No. PCT/JP2005/023070 on Dec. 15, 2005, now abandoned.

(30) Foreign Application Priority Data

Dec. 17, 2004 (JP) ................................ 2004-365402
Feb. 4, 2005 (JP) ................................ 2005-028880

(51) Int. Cl.
*G06K 9/60* (2006.01)
*G06F 17/30* (2006.01)
(Continued)

(52) U.S. Cl.
CPC .... *G06F 17/3028* (2013.01); *G06F 17/30247* (2013.01); *G06F 17/30265* (2013.01);
(Continued)

(58) Field of Classification Search
None
See application file for complete search history.

(56) References Cited

U.S. PATENT DOCUMENTS 6,025,780 A * 2/2000 Bowers .............. G06K 19/0701
340/10.51
6,791,603 B2 9/2004 Lazo et al.
(Continued)

FOREIGN PATENT DOCUMENTS

JP 2-108192 U 8/1990
JP 09-038267 A 2/1997
(Continued)

OTHER PUBLICATIONS

Extended European Search Report dated Jul. 11, 2011; Appln. No. 05816622.4-1224/1841229 PCT/JP2005023070.
(Continued)

*Primary Examiner* — Andrae S Allison
(74) *Attorney, Agent, or Firm* — Ladas & Parry LLP

(57) ABSTRACT

An image information management system includes: a storage medium on which peculiar information is stored; a reading device which reads the peculiar information stored on the storage medium; an image imaging device which shoots a video of a vicinity of a place at which the reading device is provided when the peculiar information stored on the storage medium is read by the reading device; and a processing device which associates, with the peculiar information, image information shot with using the imaging device in a constant time including a time point at which the reading device reads the peculiar information, and registers them in a storage unit. The image information management system reads the peculiar information stored on the storage medium, and associates the peculiar information with the picture information to store them in the storage unit. Then, based on the peculiar information, the image information
(Continued)

management system chooses the picture information associated with the peculiar information and stored on the storage unit, and displays it on a display.

6 Claims, 14 Drawing Sheets

(51) Int. Cl.

| | | |
|---|---|---|
| *G06K 9/00* | (2006.01) | |
| *G08B 13/196* | (2006.01) | |
| *H04N 5/77* | (2006.01) | |
| *H04N 5/92* | (2006.01) | |
| *H04N 21/258* | (2011.01) | |
| *H04N 21/418* | (2011.01) | |
| *H04N 21/4223* | (2011.01) | |
| *H04N 21/433* | (2011.01) | |
| *H04N 21/4363* | (2011.01) | |
| *H04N 21/442* | (2011.01) | |
| *H04N 7/18* | (2006.01) | |

(52) U.S. Cl.
CPC ... *G06K 9/00771* (2013.01); *G08B 13/19695* (2013.01); *H04N 5/77* (2013.01); *H04N 5/9206* (2013.01); *H04N 7/188* (2013.01); *H04N 21/25866* (2013.01); *H04N 21/4182* (2013.01); *H04N 21/4223* (2013.01); *H04N 21/4334* (2013.01); *H04N 21/43632* (2013.01); *H04N 21/44218* (2013.01)

(56) References Cited

U.S. PATENT DOCUMENTS

| 6,965,294 | B1* | 11/2005 | Elliott | G07C 9/00896 |
| | | | | 235/382 |
| 6,970,183 | B1 | 11/2005 | Monroe | |
| 7,183,895 | B2* | 2/2007 | Bazakos | G06K 9/00228 |
| | | | | 235/375 |
| 7,185,808 | B2* | 3/2007 | Mitsumoto | G06K 17/0022 |
| | | | | 235/375 |
| 7,286,158 | B1 | 10/2007 | Griebenow | |
| 2001/0022615 | A1 | 9/2001 | Fernandez et al. | |
| 2001/0031072 | A1* | 10/2001 | Dobashi | G06K 9/00228 |
| | | | | 382/118 |
| 2002/0191817 | A1* | 12/2002 | Sato | G07C 9/00158 |
| | | | | 382/118 |
| 2003/0044046 | A1 | 3/2003 | Nakamura et al. | |
| 2003/0197612 | A1* | 10/2003 | Tanaka | G06K 17/00 |
| | | | | 340/572.1 |
| 2004/0056087 | A1* | 3/2004 | Bonneau, Jr. | G06Q 20/346 |
| | | | | 235/380 |
| 2004/0105006 | A1* | 6/2004 | Lazo | G07C 9/00111 |
| | | | | 348/169 |
| 2004/0201738 | A1 | 10/2004 | Moores, Jr. et al. | |
| 2005/0110610 | A1* | 5/2005 | Bazakos | G06K 9/00228 |
| | | | | 340/5.82 |
| 2005/0205668 | A1* | 9/2005 | Sogo | G07C 9/00087 |
| | | | | 235/382 |
| 2006/0064384 | A1* | 3/2006 | Mehrotra | G01S 3/7864 |
| | | | | 705/57 |
| 2006/0078047 | A1* | 4/2006 | Shu | G06F 17/3079 |
| | | | | 375/240.01 |
| 2006/0082438 | A1 | 4/2006 | Bazakos et al. | |
| 2006/0167833 | A1* | 7/2006 | Wallerstorfer | G06Q 20/401 |
| 2006/0181392 | A1 | 8/2006 | Watson | |
| 2007/0222859 | A1 | 9/2007 | Chang et al. | |

FOREIGN PATENT DOCUMENTS

| JP | 09-198577 A | 7/1997 |
| JP | 10-222773 A | 8/1998 |
| JP | 2001-052273 A | 2/2001 |
| JP | 2001-267306 A | 9/2001 |
| JP | 2001-302133 A | 10/2001 |
| JP | 2003-027796 A | 1/2003 |
| JP | 2003-067869 A | 3/2003 |
| JP | 2004-005511 A | 1/2004 |
| JP | 2004-310172 A | 11/2004 |
| WO | 2004/034347 A1 | 4/2004 |

OTHER PUBLICATIONS

International Search Report mailed Feb. 7, 2006; PCT/JP2005/023070.

James Black, et al; "A Hierarchical Database for Visual Surveillance Applications", 2004 IEEE International Conference on Multimedia and Expo (ICME), pp. 1571-1574.

Robert T. Collins, et al; "A system for Video Surveillance and Monitoring", The Robotics Institute, Carnegie Mellon University, Pittsburgh, PA, 1 The Sarnoff Corporation, Princeton, NJ 2000, 69 pages.

Faith Porikli, et al; "Multi-Camera Calibration, Object Tracking and Query Generation", Multimedia and Expo, 2003. ICME '03. Proceedings. 2003 International Conference on, vol. 1, No. 1, pp. 653-656; Jul. 6-9, 2003.

Ediz Saykol, et al; "A Database Model for Querying Visual Surveillance Videos by Integrating Semantic and Low-Level Features", K.S. Candan and A. Celentano (Eds.): MIS 2005, LNCS 3665, pp. 163-176, 2005.

Chiao-Fe Shu, et al; "IBM Smart Surveillance System (S3): A Open and Extensible Framework for Event Based Surveillance", Advanced Video and Signal Based Surveillance, 2005. AVSS 2005. IEEE Conference on, vol., No., pp. 318,323, Sep. 15-16, 2005.

Ying-Li Tian, et al; "Event detection, query, and retrieval for video surveillance", Zhia Information Science Reference, 2009; 30 pages, Book chapter for Artificial Intelligence for Maximizing Content Based Image Retrieval.

USPTO RR dated May 27, 2011 in connection with U.S. Appl. No. 11/721,839.

USPTO NFOA dated Sep. 19, 2011 in connection with U.S. Appl. No. 11/721,839.

USPTO FOA dated Feb. 27, 2012 in connection with U.S. Appl. No. 11/721,839.

USPTO NFOA dated May 9, 2013 in connection with U.S. Appl. No. 11/721,839.

USPTO FOA dated Dec. 16, 2013 in connection with U.S. Appl. No. 11/721,839.

USPTO NFOA dated May 27, 2014 in connection with U.S. Appl. No. 11/721,839.

\* cited by examiner

| ID INFORMATION | NAME | DEPARTMENT (dept) | CAMERA NUMBER | CAMERA SETTING PLACE | IMAGED TIME | IMAGED DATA |
|---|---|---|---|---|---|---|
| d15612 | TARO NIPPON | 1st SALES dept | 1 | HEAD OFFICE ENTRANCE | 3 Dec 2004 8:10-8:13 | |
| d21463 | HANAKO TOKYO | GENERAL SERVICE dept | 1 | HEAD OFFICE ENTRANCE | 3 Dec 2004 9:15-9:18 | |
| d01516 | NOBORU ASAHI | 2nd PLANNING dept | 2 | PLANNING dept BUILDING ENTRANCE | 3 Dec 2004 7:50-7:53 | |

| TAG NUMBER | CLIENT | PHONE NUMBER | CAMERA NUMBER | CAMERA SETTING PLACE | IMAGED TIME | IMAGED DATA |
|---|---|---|---|---|---|---|
| 01612 | JIRO NIPPON | XXX-XXXX | 1 | SHIZUOKA STOPPING POINT | 3 Dec 2004 10:10-10:12 | //////// |
| 13155 | SABURO SHINJUKU | XXX-XXXX | 1 | SHIZUOKA STOPPING POINT | 3 Dec 2004 10:18-10:20 | //////// |
| 40201 | ICHIRO SHIBUYA | XXX-XXXX | 1 | SHIZUOKA STOPPING POINT | 3 Dec 2004 10:30-10:32 | //////// |
| | | | | | | |

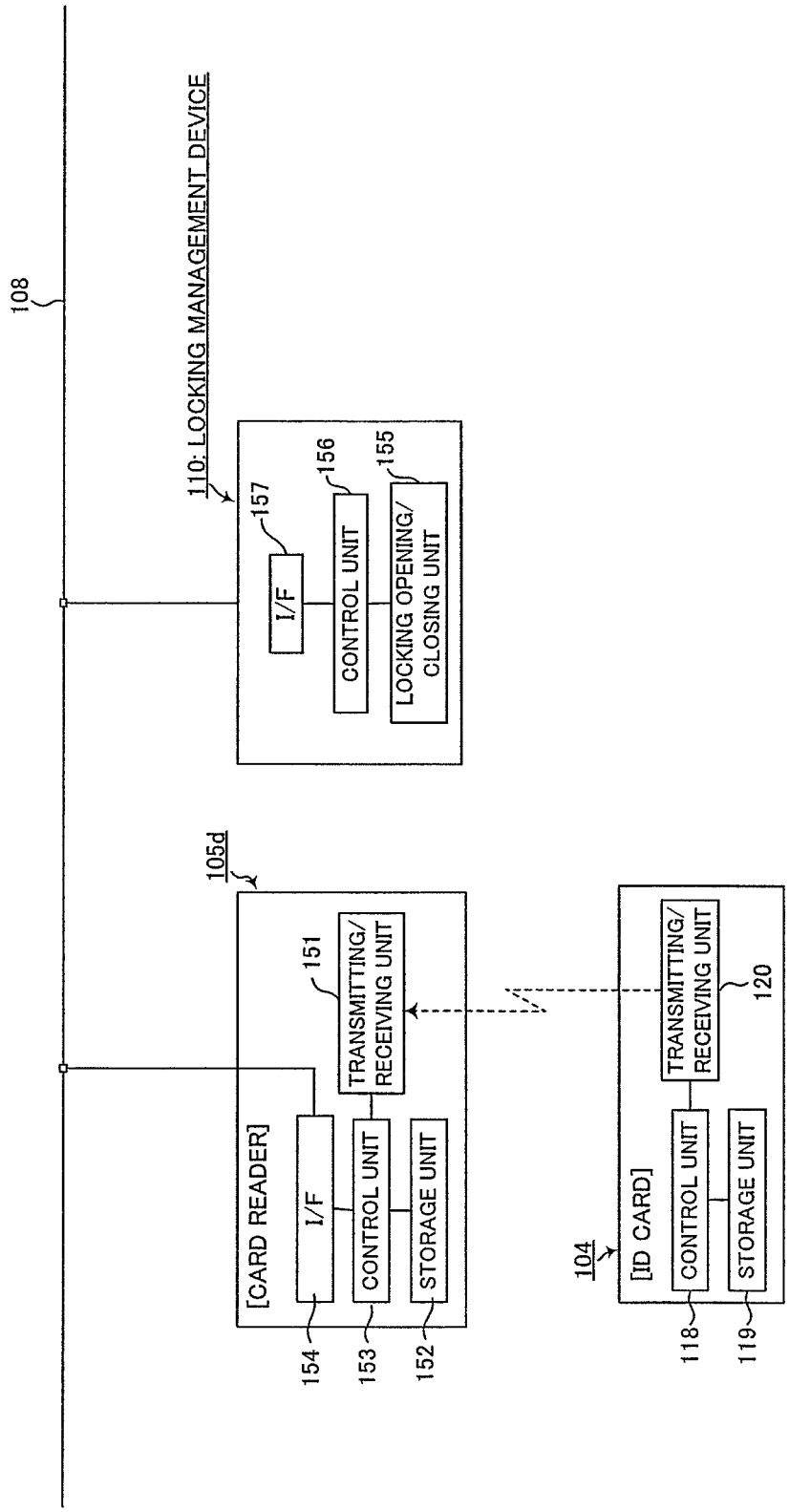

FIG. 16

| EMPLOYEE ID NUMBER | NAME | DEPARTMENT (dept) | CAMERA NUMBER | CAMERA SETTING PLACE | IMAGED TIME | IMAGED INFORMATION |
|---|---|---|---|---|---|---|
| d15612 | TARO NIPPON | 1st SALES dept | 1 | HEAD OFFICE 5th FLOOR 1st SALES dept | 3 Dec 2004 8:10-11:50 | ▨ |
| d21463 | HANAKO TOKYO | GENERAL SERVICE dept | 2 | HEAD OFFICE 5th FLOOR COPY MACHINE | 3 Dec 2004 9:15-9:18 | ▨ |
| d01516 | NOBORU ASAHI | 2nd PLANNING dept | 3 | HEAD OFFICE 5th FLOOR PRINTER | 3 Dec 2004 9:50-9:53 | ▨ |
| d21551 | ICHIRO SHINJUKU | ENGINEERING dept | 8 | FACTORY 1st FLOOR COPY MACHINE | 4 Dec 2004 10:05-10:10 | ▨ |
| d52165 | SABURO SHIBUYA | PERSONNEL dept | 6 | HEAD OFFICE 2nd FLOOR COPY MACHINE | 5 Dec 2004 11:32-11:40 | ▨ |
| d03142 | JIRO OTSUKA | PLANNING dept | 12 | PLANNING dept BUILDING 4th FLOOR PLANNING dept | 6 Dec 2004 9:10-12:10 | |

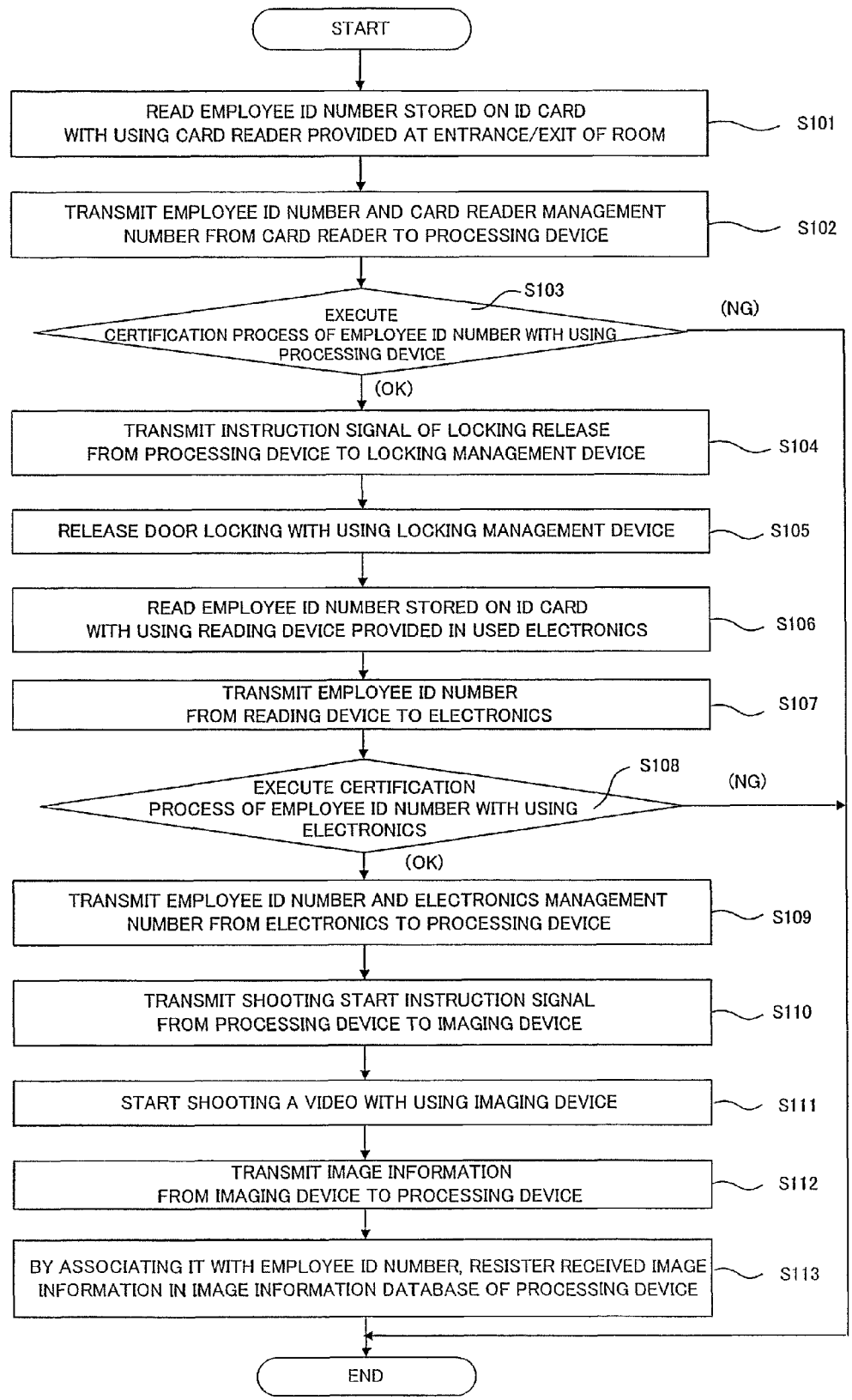

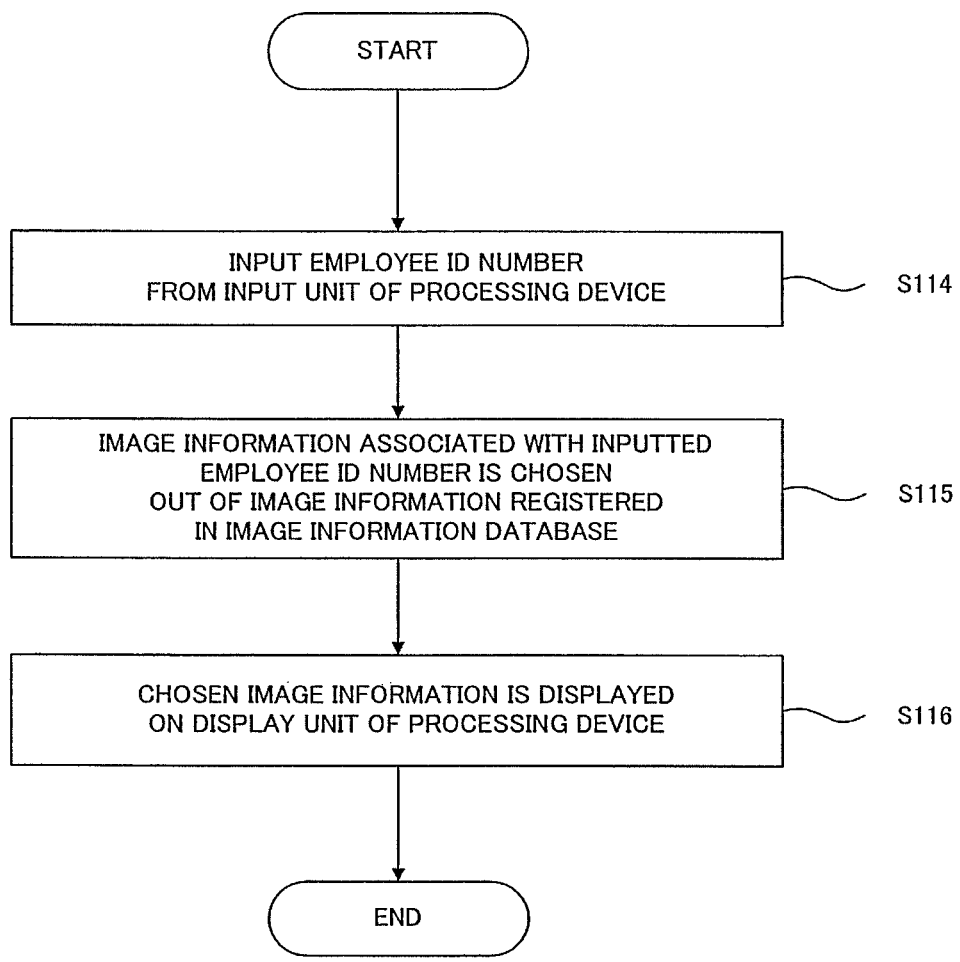

IMAGE INFORMATION MANAGEMENT SYSTEM AND METHOD THEREOF, AND IMAGE INFORMATION SEARCH SYSTEM

TECHNICAL FIELD

The present invention relates to an image information management system and a method thereof, and an image information search system, capable of easily choosing only a picture of a part of specific person and article out of a record of image information shot with using an imaging device such as a security camera, displaying it on a display unit and seeing it.

BACKGROUND TECHNIQUE

Conventionally, a suspicious individual is imaged with using an imaging device such as a security camera in order to use it for security or as strong evidential information for identifying a criminal person.

As a system with using the security camera, there is known such a system that a predetermined place is imaged with using the security camera at any time and its image information is stored as a picture so that a criminal behavior is confirmed by displaying the recorded image information on a display in a case of a crime and/or an accident. In addition, there is known a suspicious individual imaging system (see Patent References-1 to 5, for example), in which a suspicious individual intrusion detector is provided in advance in the system, and in a case of intrusion of a suspicions individual, the suspicious individual is imaged by operating a security camera.

There is also known such a system that movement of employees is recorded as a picture by shooting a picture of their working floor with using a security camera, and a situation of an office crime and intrusion of a suspicious individual can be investigated later, as a countermeasure against an office crime.

However, in such a case that the criminal person is the trusted employee, like the office crime, since he or she is not imaged by the suspicious individual intrusion detector as the suspicious individual, the imaging system of the suspicious individual is useless.

Thus, in this case, such a time-consuming work that the predetermined place is imaged with using the security camera at any time and the picture of the suspicious employee is searched out of history information of the image information and confirmed becomes necessary.

However, it is difficult to efficiently search and check the picture of the person being the desired object in a short time.

When the object is an article, it is not easy to search the picture of the specific article out of recorded picture imaged with using the security camera.

When a status of a delivery route of a package is searched, a security camera is provided at a delivery stopping point, and the delivered package is imaged at any time. Thereby, it becomes possible that the picture of the package is recorded and the delivery status is stored as picture data.

However, when the specific delivery route status is investigated by inquiry from a delivery client, there are problems: the picture of the package cannot be easily searched out; even if the package is imaged by the provided security camera, the relation between each of packages and the picture does not become clear; and it cannot be searched out and seen which picture includes the specific package, in a short time.

Recently, in accordance with development of electronics such as a personal computer, important information such as confidential information and personal data can be managed and searched with using the personal computer. Thereby, efficiency of office work can be enhanced.

By managing the important information with using the electronics such as the personal computer, the efficiency of office work is enhanced. However, at the same time, there is such a risk that the important information and the large amount of data can be easily stolen by the user of the electronics.

Therefore, so as to prevent the damage from spreading, it becomes necessary to collect information of the suspicious individual in a short time and take a rapid action, in such a case that the employee capable of rightly using the electronics such as the personal computer does an injustice with using the electronics, and in such a case that a certain employee spoofs other employee and uses the electronics to do an injustice.

In this case, there is such a method that the image information shot with using the security camera at any time is displayed on the display and the criminal behavior is confirmed. However, it is problematically time-consuming and inefficient to search out the picture of the suspicious employee out of the large amount of image information.

Patent Reference-1: Japanese Patent Application Laid-open under No. 9-198577

Patent Reference-2: Japanese Patent Application Laid-open under No. 10-222773

Patent Reference-3: Japanese Patent Application Laid-open under No. 2001-302133

Patent Reference-4: Japanese Patent Application Laid-open under No. 2004-5511

Patent Reference-5: Japanese Utility Model Laid-open under No. 2-108192

DISCLOSURE OF INVENTION

Problem to be Solved by the Invention

It is an object of this invention to provide an image information management system and a method thereof, and an image information search system, capable of efficiently searching out and seeing a picture of a desired object out of image information shot by an imaging device such as a security camera in a short time.

Means for Solving the Problem

According to one aspect of the present invention, there is provided an image information management system including: a storage medium on which peculiar information is stored; a reading device which reads the peculiar information stored on the storage medium; an imaging device which shoots a video of a vicinity of a place at which the reading device is provided when the peculiar information stored on the storage medium is read by the reading device; and a processing device which associates, with the peculiar information, image information shot with using the imaging device in a constant time including a time point at which the reading device reads the peculiar information, and registers them in a storage unit.

In the above image information management system, since the image information shot by the imaging device is associated with the peculiar information stored on the storage medium owned by an object or attached to the object to be registered in the storage unit, the desired object to be displayed and seen on the display can be easily and efficiently searched out of the peculiar information to be displayed and seen on the display.

In a manner of the above image information management system, the imaging device may start shooting when the reading device reads the peculiar information stored on the storage medium. In this manner, the shooting by the imaging device starts when the reading device reads the peculiar information stored on the storage medium. Hence, useless picture recording can be omitted.

In another manner of the above image information management system, the storage medium may be used for the purpose of possession by a person, and the peculiar information may be ID information capable of specifying an owner of the storage medium. In this manner, the ID card is used as the storage medium, and the peculiar information is capable of specifying the owner of the ID card, Thereby, it becomes possible to efficiently choose and see the picture of the specific person out of the picture of the persons being objects in a short time.

In still another manner of the above image information management system, the storage medium may be a non-contact IC tag attached to an article. In this manner, since the storage medium is the IC tag attached to the article, it becomes possible to efficiently choose and see the picture of the specific article out of the picture of the article being the object in a short time.

According to another aspect of the present invention, there is provided an image information management method including: a step which reads peculiar information stored on a storage medium; a step which shoots a video of a vicinity of a place at which a reading device of the peculiar information is provided; a step which associates the peculiar information with image information shot in a constant time including a time point at which the peculiar information is read, and stores them in the storage unit; and a step which, based on the peculiar information, chooses the image information associated with the peculiar information and stored in the storage unit, and displays it on a display, when a specific picture is displayed on the display out of the image information.

In accordance with the above image information management method, it becomes possible to easily and efficiently search the picture of the desired object out of the read peculiar information to display and see it on the display.

According to still another aspect of the present invention, there is provided an image information search system including; a storage medium on which peculiar information capable of specifying a user is stored; a reading device which reads the peculiar information stored on the storage medium; electronics which are connected to the reading device and receives the peculiar information read by the reading device; an imaging device which shoots a video of the user of the electronics; and a processing device which is connected to the electronics and the imaging device, wherein the electronics include a unit which transmits, to the processing device, the peculiar information received from the reading device, wherein the imaging device includes a unit which transmits image information to the processing device, and wherein the processing device includes: an image information database which associates the image information received from the imaging device with the peculiar information received from the electronics, and stores them; and a unit which chooses the image information associated with the peculiar information and stored in the image information database, based on inputted peculiar information, when specific image information is chosen out of the image information stored in the image information database.

In the above image information search system, since the image information of the user of the electronics is associated with the peculiar information stored on the storage medium of the user to be stored, it becomes possible to efficiently search out only the picture of the specific user based on the peculiar information in a short time.

In a manner of the above image information search system, in a case of receiving the peculiar information from the electronics, the processing device may include a unit which transmits an instruction signal for starting shooting to the imaging device.

In another manner of the above image information search system, in a case of receiving the peculiar information from the electronics, the imaging device may start shooting.

In still another manner of the above image information search system, the processing device may include: a display unit which displays the image information stored in the image information database; and an input unit which inputs the peculiar information. In this manner, it becomes possible to efficiently display the image information chosen based on the peculiar information inputted from the input unit on the display unit and confirm it in a short time.

In still another manner of the above image information search system, the processing device may be connected to plural electronics and plural imaging devices.

In still another manner of the above image information search system, the processing device may receive the peculiar information from the electronics including a peculiar information input unit and a display unit, connected to the processing device to search the image information.

In still another manner of the above image information search system, the plural processing devices may be provided, and a peculiar information input unit and a display unit, connected to the plural processing devices, may receive the peculiar information from the electronics and search the image information. In this manner, since the processing device is connected to the plural electronics and the plural imaging devices, the image information shot by the plural imaging devices can be unified and managed by the processing device. Thus, even when many electronics are provided, it becomes possible to choose the image information of only the specific user out of the image information of the users and display on the display unit.

BRIEF DESCRIPTION OF THE DRAWINGS

FIG. 15 is a system block diagram of the image information search system according to the third embodiment of the present invention;

FIG. 16 is a table showing an example of information registered in the image information database of the image information search system according to the third embodiment of the present invention;

FIG. 17 is a flow chart showing a procedure of the image information search system according to the third embodiment of the present invention; and FIG. 18 is a flow chart showing a procedure of the image information search system according to the third embodiment of the present invention.

BRIEF DESCRIPTION OF THE REFERENCE NUMBER

Figure 1:
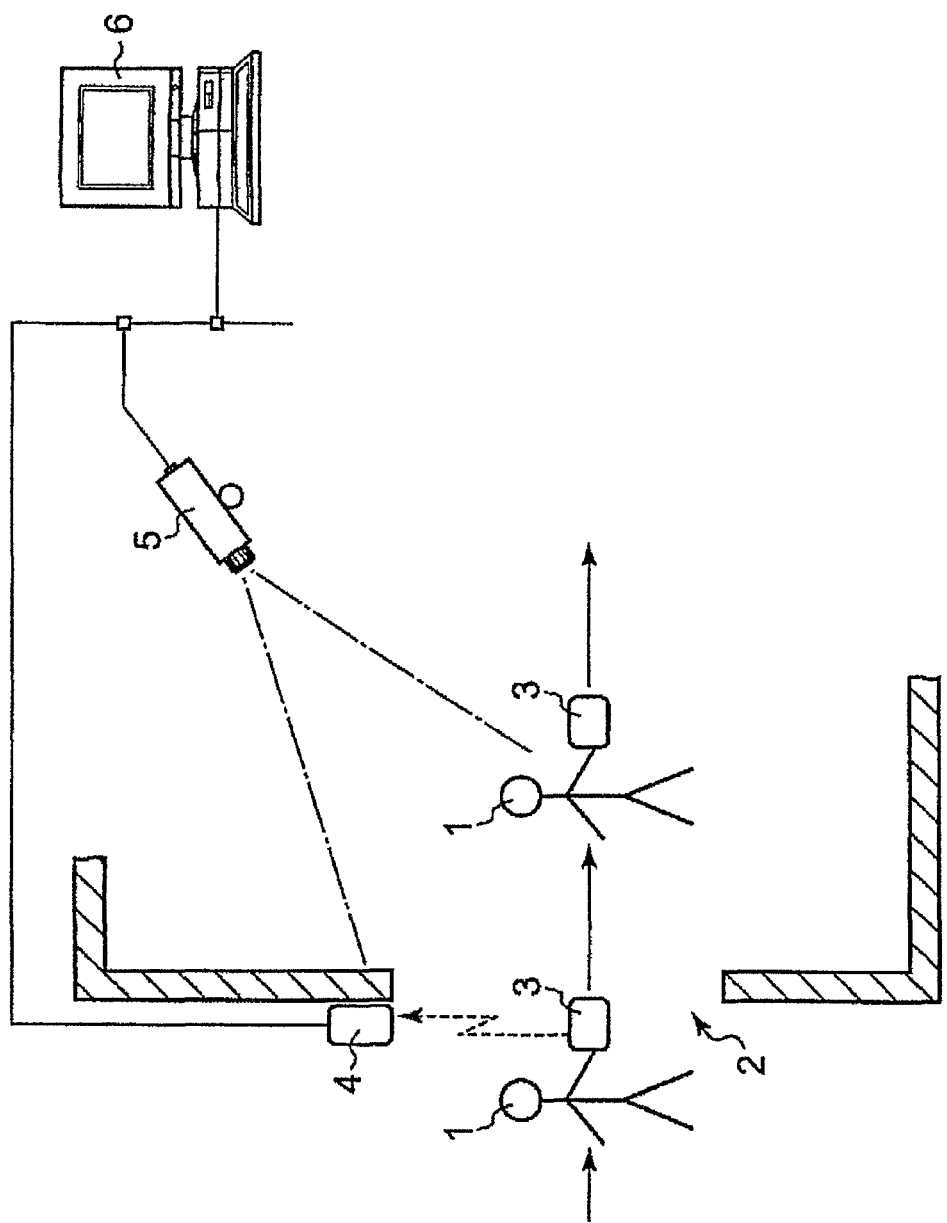
FIG. 1 is a diagram for explaining an outline of a configuration of an image information management system according to a first embodiment of the present invention.

1 Employee
2 Entrance
3 ID card
3a, 3b Card base materials
4, 32 Reading devices
5, 33 Imaging devices
6, 34 Processing devices
8 Non-contact IC tag
101 Room in which room entrance is managed
102 Electronics
102a Personal computer
102b Copy machine
102c Printer
103 Imaging device
103a, 103b, 103c, 103d Security cameras
104 ID card
104a, 104b Card base materials
105 Reading device
105a, 105b, 105c, 105d Card readers

DETAILED DESCRIPTION OF THE PREFERRED EMBODIMENTS

Now, a description will be given of the image information management system and the method thereof according to embodiments of the present invention in details, with reference to attached drawings.

First Embodiment

Figure 2:
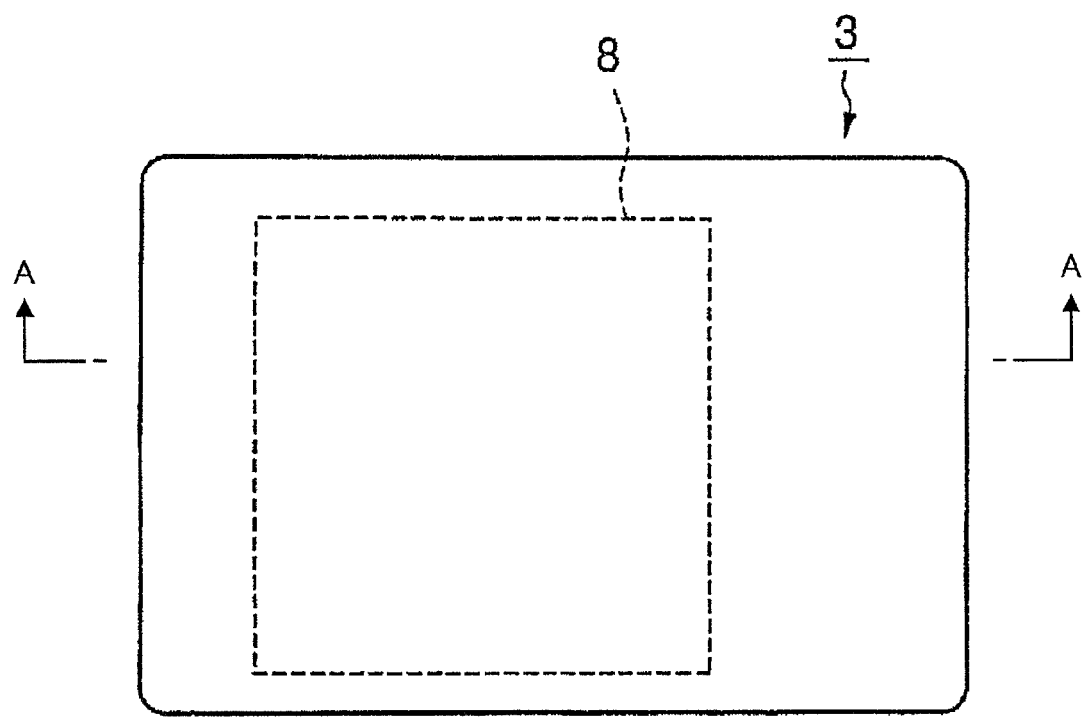
FIG. 2 is a plan view of an ID card used in the image information management system according to the first embodiment of the present invention.
Figure 3:
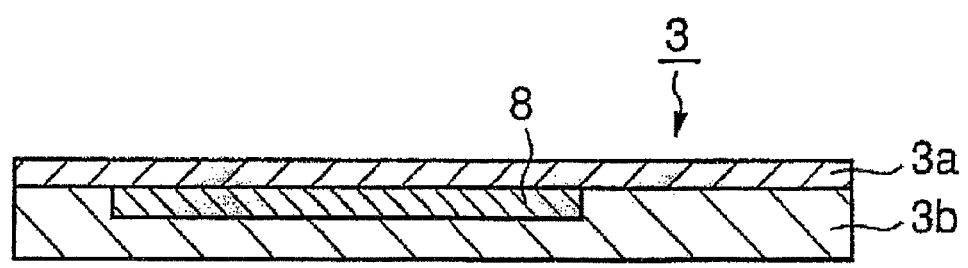
FIG. 3 is a cross-sectional view of FIG. 2 when cut along a cutting line A-A.
Figure 4:
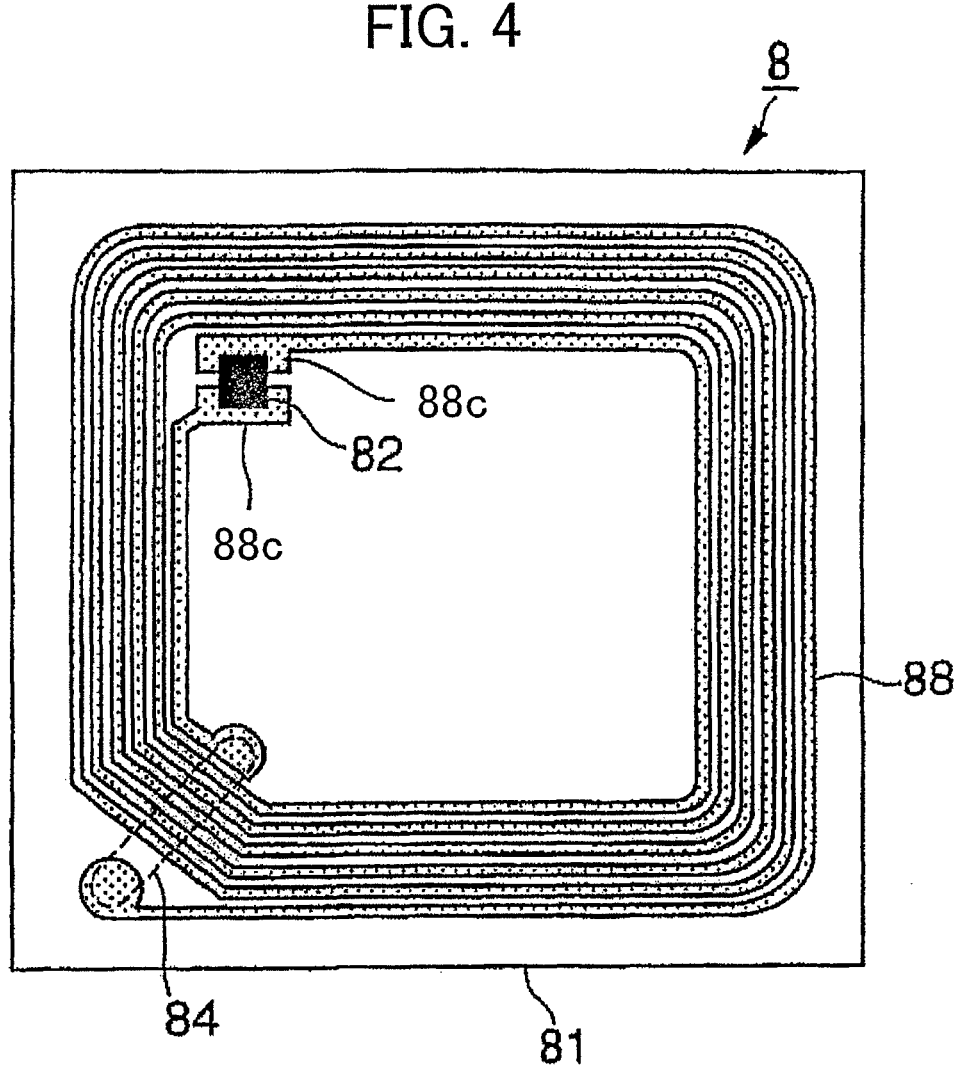
FIG. 4 is a plan view of an IC tag provided on the ID card.
Figure 5:
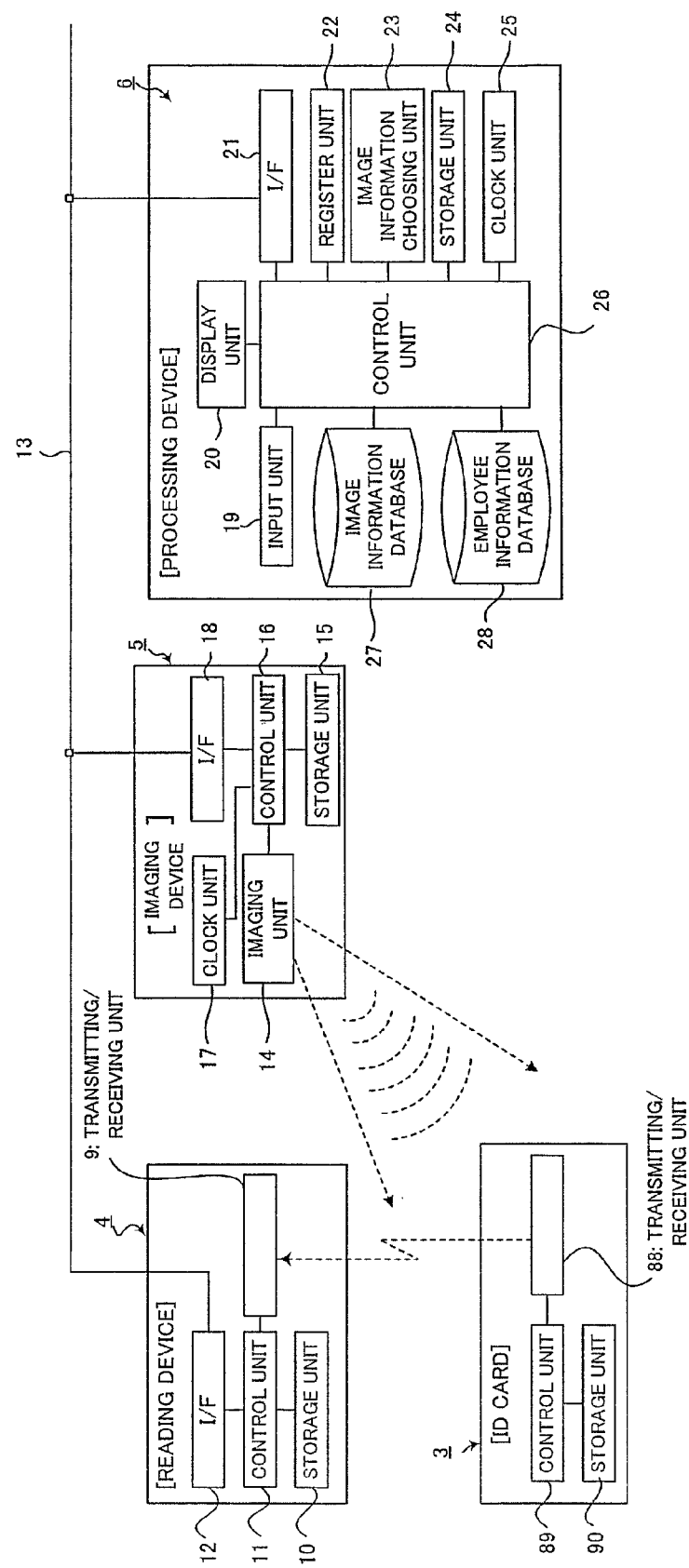
FIG. 5 is a system block diagram of the image information management system according to the first embodiment of the present invention.
Figures 6, 7:
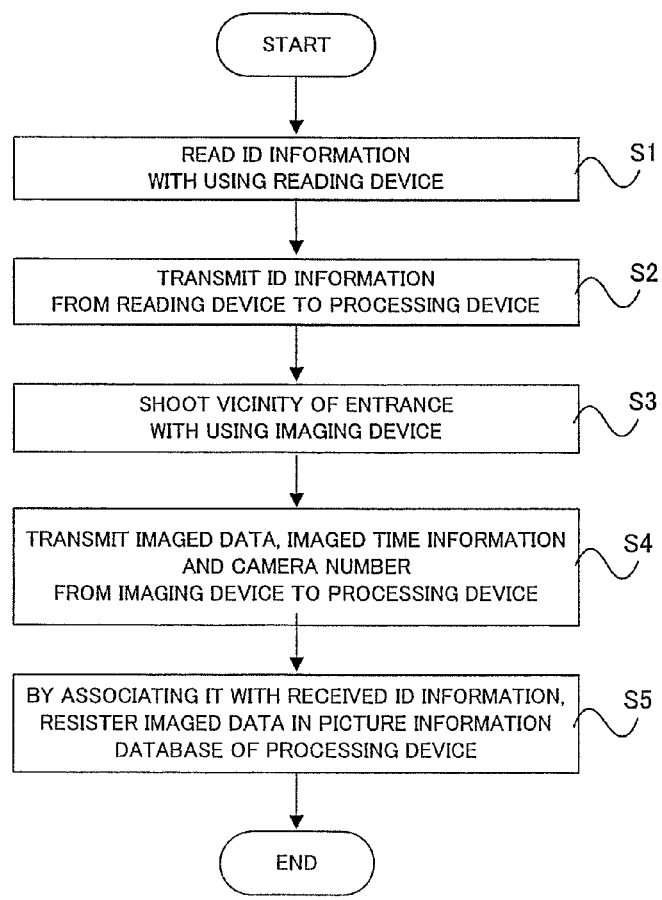
FIG. 6 is a table showing data contents of an image information database of the image information management system according to the first embodiment of the present invention.
FIG. 7 is a flow chart showing a procedure of the image information management system according to the first embodiment of the present invention.

FIG. 1 is a diagram for explaining the outline of the configuration of the image information management system according to a first embodiment of the present invention. FIG. 2 is a plan view of the ID card used in the image information management system according to the first embodiment of the present invention. FIG. 3 is a cross-sectional view of FIG. 2 when cut along the cutting line A-A. FIG. 4 is a plan view of the IC tag provided on the ID card. FIG. 5 is a system block diagram of the image information management system according to the first embodiment of the present invention. FIG. 6 is a diagram showing data contents of the image information database of the image information management system according to the first embodiment of the present invention. FIG. 7 is a flow chart showing a procedure of the image information management system according to the first embodiment of the present invention.

As shown in FIG. 1, the image information management system according to the first embodiment of the present invention includes: a reading device 4 capable of reading ID information, stored on an ID card 3 being an employee ID card owned by an employee 1, without contact, at an entrance 2 of a gate through which he or she passes at the time of entering a site of his or her company; and an imaging device 5 for shooting a video of the vicinity of the entrance 2, for example. The reading device 4, the imaging device 5 and a processing device 6 including a personal computer are connected to each other via a communication line 13.

The ID card 3 being the employee ID card owned by the employee 1 is formed by the non-contact IC card, and has such a configuration that a non-contact IC tag 8 is integrated inside of card base materials 3a and 3b, as shown in FIG. 2 to FIG. 4, for example. The non-contact IC tag 8 is also referred to as "non-contact data carrier" or "RFID", and a transmitting/receiving unit 88 including a coil pattern is formed on a base material 81 made of plastic, as shown in FIG. 4. The non-contact IC tag 8 forms a resonant circuit with using a coil and a capacitative element to receive and transmit an acoustic wave of a constant frequency. Additionally, as another system, power transmission and data transmission may be performed by electromagnetic induction of a carrier wave from a reader/writer.

Generally, frequency bands of 135 kHz (medium wave), 13.56 MHz and 2.45 GHz (micro wave) are used. In the case of the shown example, the transmitting/receiving unit 88 including the coil pattern forms a jumping circuit on the rear side of the base material 81 by a continuity member 84, and is connected to a bump on the rear side of an IC chip 82 by a coil connection terminal 88C.

The IC chip 82 includes a control unit 89 serving as a CPU and a storage unit 90 serving as a memory. In the shown example, the capacitative element is integrated in the IC chip 82.

The non-contact IC tag 8 is formed by forming the coil pattern by the photo etching or the etching after resist print of metallic foil such as aluminum foil laminated on a resin base material, mounting the IC chip 82, and providing a protective coating. The size can be equal to or smaller than 30 mm×30 mm.

The resin base material 81 used for the non-contact IC tag 8 can be made of various kinds of materials such as PET, polypropylene, polyethylene, polystyrene and nylon. Moreover, the resin base material 81 may be made of paper. Though thickness thereof can be 15-300 μm, 20-100 μm is preferred in consideration of the strength, the processing work property and the cost. Though copper foil, aluminum foil andiron foil can be used as the metallic foil, the aluminum foil is preferred in consideration of the cost and the processing property, and the thickness about 6-50 µm is preferred.

In reading the information recorded on the non-contact IC tag 8, the reading device 4 sends a resonating calling signal to the non-contact IC tag 8, and reads a response signal from the non-contact IC tag 8. Thereby, the information recorded in the memory being the storage unit of the IC chip 82 of the non-contact IC tag 8 can be read.

In addition, the ID information being the peculiar information for the identity certification is pre-registered in the memory being the storage unit of the IC chip 82. When the employee 1 passes through the entrance 2, the ID information can be read by the reading device 4 without contact.

Next, the configuration of the image information management system according to the first embodiment of the present invention will be explained with reference to FIG. 5.

The reading device 4 includes a transmitting/receiving unit 9, a storage unit 10, a control unit 11 and an interface (I/F) 12. The transmitting/receiving unit 9 receives the ID information from the transmitting/receiving unit 88 of the ID card 3. The storage unit 10 includes a control program. The control program is programmed to transmit the ID information received by the transmitting/receiving unit 9 to the imaging device 5 and the processing device 6 via the communication line 13.

In addition, the imaging device 5 being a camera includes an imaging unit 14, a storage unit 15, a control unit 16, a clock unit 17 and an interface (I/F) 18.

The imaging unit 14 is set in order to take a picture of the employee entering the inside from the entrance 2 of the gate and record the picture of the employee whose ID information is read by the reading device 4 without contact. When receiving the ID information transmitted from the reading device 4, the imaging unit 14 executes the imaging only for a preset time.

The clock unit 17 has a function to record the time shot by the imaging unit 14, which makes it clear from what time to what time the image information is shot.

The storage unit 15 stores the control program and the management number of the imaging device 5. The control program is programmed to transmit the image information shot by the imaging unit 14, time information indicating time at which the image information is produced, and the management number information of the imaging device 5 to the processing device 6 via the communication line 13.

The processing device 6 includes an input unit 19, a display unit 20 having a display, an interface (I/F) 21, a register unit 22, an image information choosing unit 23, a storage unit 24, a clock unit 25, a control unit 26, an image information database 27 and an employee information database 28.

In the employee information database 28, ID information set for each employee and information such as a name, a position, a department, a phone number and a company joining date, associated with the ID information, are registered in advance as employee information.

The register unit 22 associates the ID information received from the reading device 4 via the communication line 13 with the image information, the time information and the management member information of the imaging device 5, received from the imaging device 5, and registers them in the image information database 27.

Further, the register unit 22 chooses the preset information out of the employee information registered in the employee information database 28 based on the ID information received from the reading device 4, and associates it with the ID information to register them in the image information database 27.

In addition, the processing device 6 also includes the clock unit 25, which makes it clear what time the ID information is received from the reading device 4 via the communication line 13. The image information is registered in the image information database 27 in such a case that the time of receiving of the ID information and the imaging time information of the image information received from the imaging device 5 coincide with each other. Namely, in the picture shot at the substantially same time as that of reading of the ID information by the reading device 4, the employee specified by the ID information is imaged.

FIG. 6 shows an example of the information registered in the image information database 27.

As shown in FIG. 6, a name, a department, a camera number, a camera setting place, an imaged time and imaged data, associated with the ID information, are registered in the image information database 27.

Therefore, when only the picture of the specific employee is chosen and seen, the imaged data in which the employee is imaged can be easily displayed and seen on the display unit on the basis of the ID information and the name.

Next, a description will be given of the procedure of the image information management system according to the first embodiment of the present invention, with reference to the flow chart shown in FIG. 7.

At the entrance 2 of the gate, the ID information stored on the ID card 3 owned by the employee is read by the reading device 4 (step S1). The ID information read by the reading device 4 is transmitted to the processing device 6 via the communication line 13 (step S2).

On receiving the ID information from the reading device 4, the imaging device 5 makes the imaging unit 14 start shooting the vicinity of the entrance 2 (step S3). The imaged picture data is transmitted to the processing device 6 with the imaged time information by the clock unit 17 of the imaging device 5 and the camera number information stored in the storage unit 15 (step S4).

The processing device 6, receiving the information, extracts the name and the department in the information registered in the employee information database 28 based on the received ID information, and associates them with the ID information to register them in the image information database 27 by the register unit 22. At the same time, the processing device 6 associates the camera number, the camera setting place, the imaged time and the imaged data to register them (step S5).

In the above manner, the ID information read by the reading device 4 is associated with the picture data shot by the imaging device 5, and is registered and stored in the image information database 27 of the processing device 6 in order.

When the picture of the specific desired employee is seen out of the picture data registered in the image information database 27, the user inputs the ID information of the employee into the input unit 19 of the processing device 6. Thereby, the picture data, associated with the inputted ID information to be registered, is chosen out of the image information database 27 to be displayed on the display unit 20.

In the above case, on receiving the ID information transmitted from the reading device 4, the imaging unit 14 executes the imaging only for the preset time. As another method, by making the imaging unit 14 always take the picture, the time information of shooting the picture may be associated and recorded. In this case, the imaged data shot at the same time as that of receiving of the ID information by the reading device 4 may be chosen to be displayed on the display being the display unit.

The image information management system according to the first embodiment is an appropriate example in such a case that the object is the person. However, the image information management system of the present invention is also applicable in such a case that the object is an article.

Second Embodiment

The image information management system according to a second embodiment of the present invention, which will now be explained, is an appropriate manner in such a case that the object is the article.

Figures 8, 9:
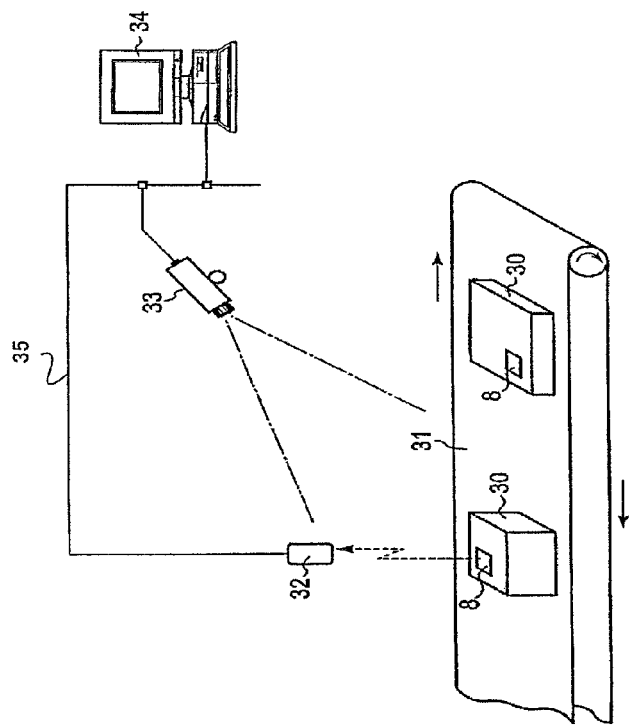
FIG. 8 is a diagram for explaining an outline of the configuration of the image information management system according to a second embodiment of the present invention.
FIG. 9 is a table showing data contents of the image information database of the image information management system according to the second embodiment of the present invention.

FIG. 8 is a diagram for explaining the outline of the configuration of the image information management system according to the second embodiment of the present invention. FIG. 9 is a table showing data contents of the image information database of the image information management system according to the second embodiment of the present invention.

FIG. 8 shows such a state that a belt conveyer 31 on which packages 30 is loaded moves at the time of distributing the packages 30 at a stopping point of a delivery company for delivery packages.

The non-contact IC tag 8 integrated with a delivery ticket is attached to each of the packages 30. A reading device 32 for reading tag information stored on the non-contact IC tag 8 without contact is provided at a predetermined position near the belt conveyer 31 for moving the packages 30.

An imaging device 33 is further provided so that the picture of the packages 30 passing through the place capable of reading the tag information stored on the non-contact IC tag 8 with using the reading device 32 without contact can be imaged at the time of moving of the packages 30. Additionally, the reading device 32, the imaging device 33 and the processing device 34 including the personal computer are connected to each other by the communication line 35.

When the moving packages 30 loaded on the belt conveyer 31 passes through the predetermined position, the reading device 32 reads the tag information stored on the non-contact IC tag 8 without contact, and transmits it to the processing device. The imaging device 33 takes a picture of the packages passing through the predetermined position and transmits the picture data thereof to the processing device 34.

As shown in FIG. 9, on receiving the tag information and the picture data, the processing device 34 extracts the client name of the package delivery and the phone number from pre-registered client information database, based on the tag information. Then, the processing device 34 associates them with the tag information and registers them in the image information database. Moreover, the processing device 34 associates the camera number, the camera setting place, the imaged time and the imaged data with the tag information and registers them.

In the above process, the tag information read by the reading device 32 is associated with the picture data shot by the imaging device 33 to be registered and stored in the image information database in the processing device 34 in order.

When the specific picture in the image information is displayed on the display being the display unit, based on the tag information, only the image information, associated with the tag information and stored in the image information database, can be chosen and can be displayed and seen on the display.

In the above embodiment, the description was given of the case that the ID card 3 being the employee ID card owned by the employee is used as the storage medium. However, the storage medium is not limited to the ID card. Namely, various kinds of storage mediums used for the purpose of possession by a person, such as a ticket and a hotel room key, may be used.

By using the storage medium such as the non-contact IC tag attached to various kinds of articles, it becomes possible that the image information of the article is managed and the picture of the desired object is efficiently searched and seen out of the image information in a short time.

Third Embodiment

Now, a description will be given of the image information search system according to a third embodiment of the present invention in details, with reference to the attached drawings.

Figure 10:
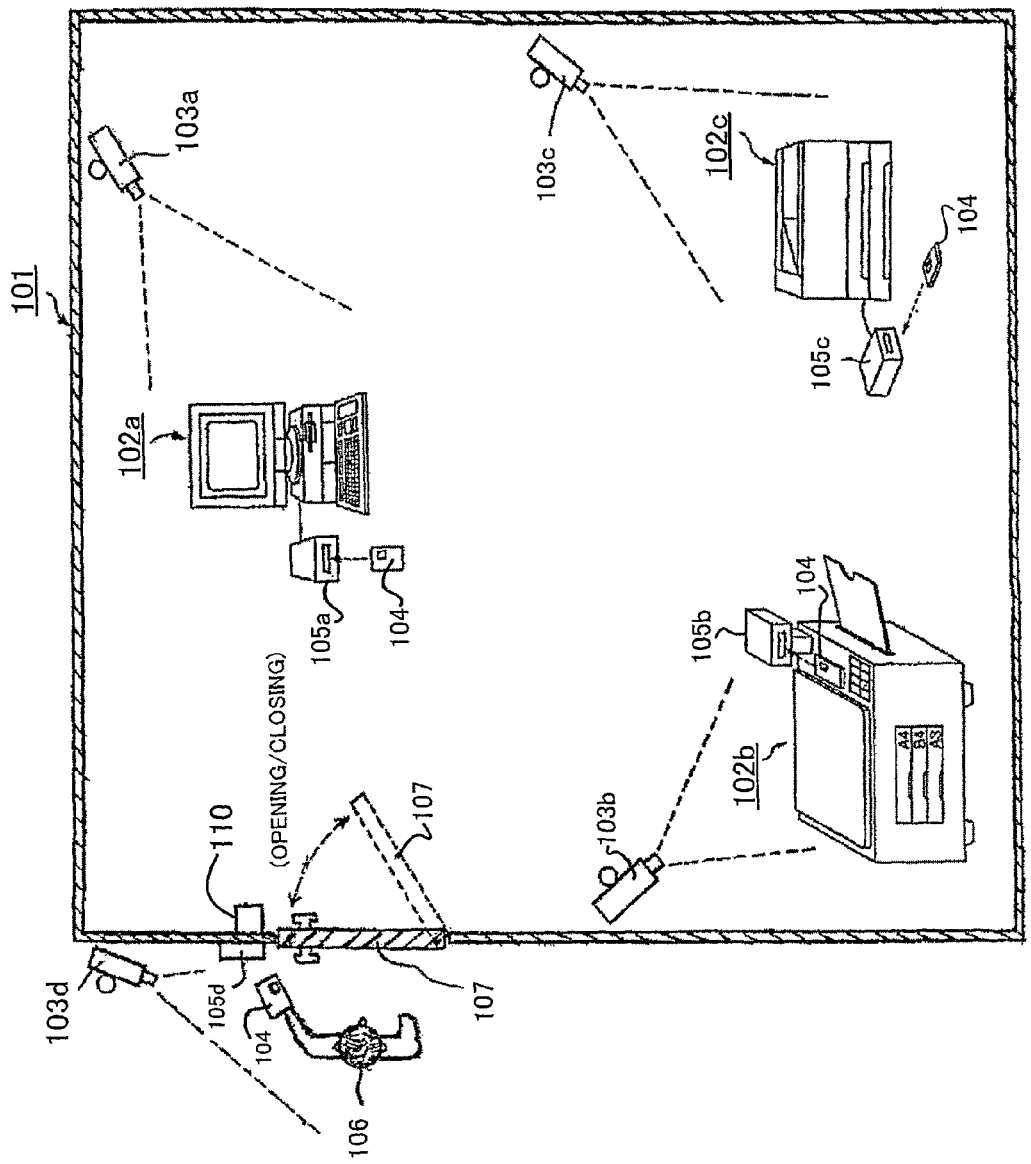
FIG. 10 is a diagram for explaining an outline of a configuration of an image information search system according to a third embodiment of the present invention.
Figure 11:
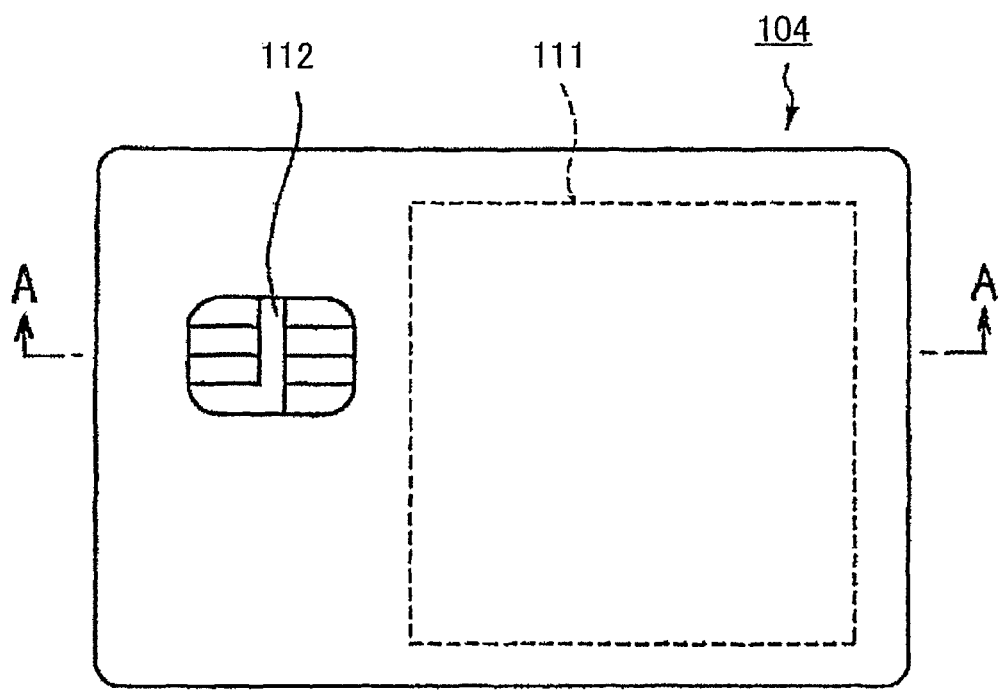
FIG. 11 is a plan view of an ID card used in the image information search system according to the third embodiment of the present invention.
Figure 12:
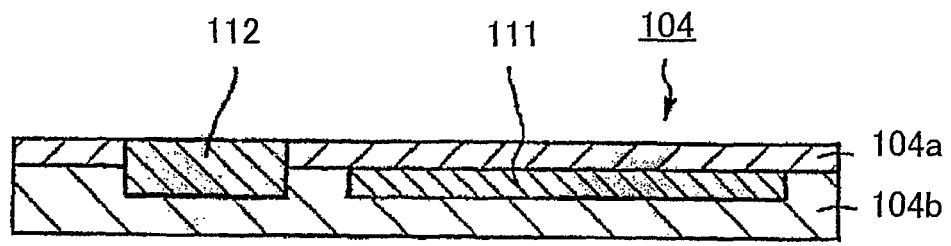
FIG. 12 is a cross-sectional view of FIG. 11 when cut along a cutting line A-A.
Figure 13:
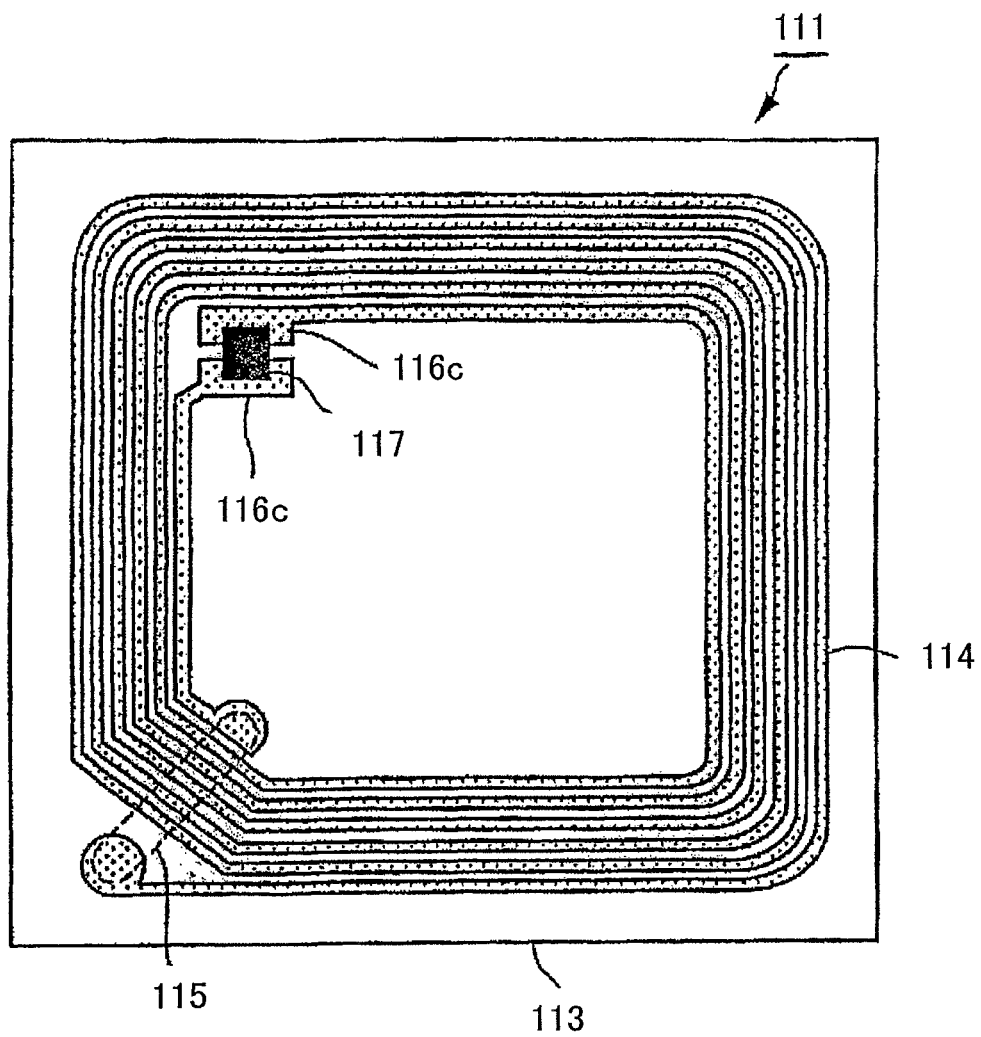
FIG. 13 is a plan view of a non-contact IC tag provided on the ID card.
Figure 14:
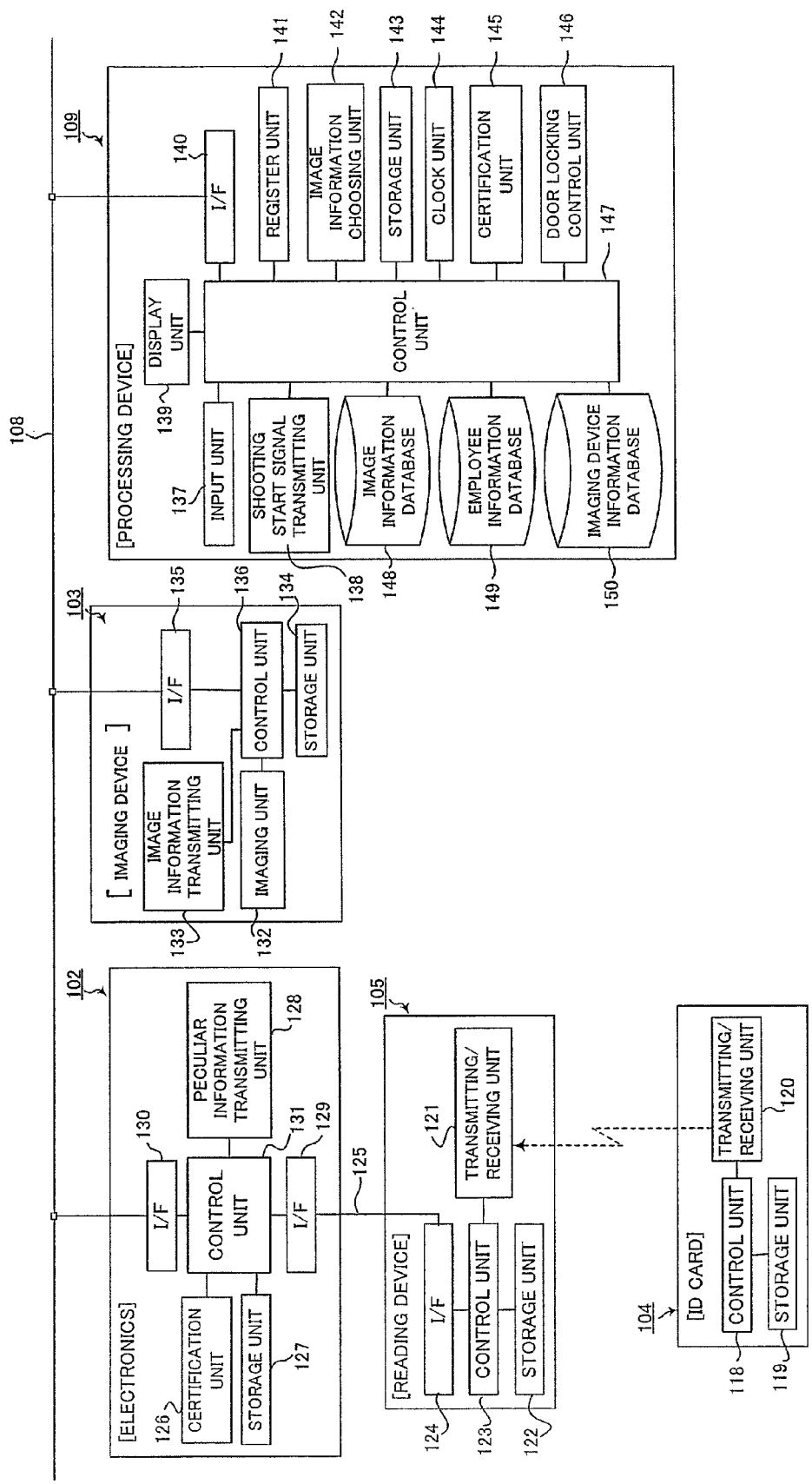
FIG. 14 is a system block diagram of the image information search system according to the third embodiment of the present invention.

FIG. 10 is a diagram for explaining the outline of the configuration of the image information search system according to this embodiment. FIG. 11 is a plan view of the ID card used in the image information search system according to this embodiment. FIG. 12 is a cross-sectional view of FIG. 11 when cut along the cutting line A-A. FIG. 13 is a plan view of the non-contact IC tag provided on the ID card. FIG. 14 and FIG. 15 are system block diagrams of the image information search system according to this embodiment. FIG. 16 is a table showing an example of information registered in the image information database of the image information search system according to this embodiment. FIG. 17 and FIG. 18 are flow charts showing a procedure of the image information search system according to this embodiment.

As shown in FIG. 10, in the image information search system according to this embodiment, a room 101 in which room entrance is managed includes plural electronics 102 including a personal computer 102a, a copy machine 102b, and a printer 102c. In addition, the room 101 includes an imaging device 103 including security cameras 103a, 103b and 103c for shooting a video of a user 106 of the electronics 102.

Moreover, card readers 105a, 105b and 105c being reading devices 105 are connected to each of the electronics 102. The card readers 105a, 105b and 105c can read an employee ID number being the peculiar information stored on the ID card 104 being the storage medium owned by the user 106.

At an entrance/exit of the room 101, an opening/closing door 107 whose locking is managed by the ID card 104 is provided. A card reader 105d for reading the employee ID number being the peculiar information stored on the ID card 104 is provided on the outer side of the entrance/exit of the room 101.

A security camera 103d for shooting a video of the person entering the room 101 from the entrance/exit thereof is further provided, and can shoot the entering person.

As shown in FIG. 14 and FIG. 15, the electronics 102 such as the personal computer 102a, the copy machine 102b and the printer 102c, the imaging device 103 such as the card reader 105d, the security cameras 103a, 103b, 103c and 103d, and the locking management device 110 are connected to the processing device 109 including the computer by the communication line 108.

The ID card 104 being the storage medium may be a storage medium: capable of storing the peculiar information capable of specifying the user of the electronics; and capable of making the reading device read the peculiar information. This point is not particularly limited. In this embodiment, such a case that the non-contact IC card having an IC module for contact is used is shown as an example of the storage medium.

As shown in FIG. 11 to FIG. 13, the ID card 104 has such a configuration that a non-contact IC tag 111 is integrated inside the card base materials 104a and 104b and an IC module 112 is embedded. Since the configuration of the non-contact IC tag 111 is same as that of the non-contact IC tag 8 shown in FIG. 4, an explanation thereof is omitted here. An IC chip 117 in the non-contact IC tag 111 includes a control unit 118 including a CPU and a storage unit 119 including a memory. Additionally, the employee ID number being the peculiar information is registered in the storage unit 119.

In reading the information recorded on the non-contact IC tag 111, the card reader being the reading device sends a resonating calling signal to the non-contact IC tag 111, and reads a response signal from the non-contact IC tag 111. Thereby, the information recorded in the memory of the IC chip 117 of the non-contact IC tag 111 can be read.

Next, a description will be given of the configuration of the image information search system according to this embodiment in details, with reference to FIG. 14 and FIG. 15.

First, a reading device 105 provided in the electronics 102 includes a transmitting/receiving unit 121, a storage unit 122, a control unit 123 and an interface (I/F) 124.

The transmitting/receiving unit 121 receives the employee ID number being the peculiar information from the transmitting/receiving unit 120 of the ID card 104 without contact. The storage unit 122 includes management number predetermined for managing each of the electronics 102 and a control program. The control program is programmed to transmit the employee ID number being the peculiar information received by the transmitting/receiving unit 121 and the management number to the electronics 102 via a communication wire 125.

The electronics 102 include a certification unit 126, a storage unit 127, a peculiar information transmitting unit 128, interfaces (I/F) 129 and 130 and a control unit 131.

Based on the employee ID number being the peculiar information received from the reading device 105, the certification unit 126 determines whether or not the user is the person permitted to use the electronics 102. The determination method is to certificate the user in a case that, by a collation process with collation information stored in the storage unit 127, a collation result of coincidence of both of the information is obtained.

The electronics 102 are in a locked state and unusable until the certification in the certification unit 126 is approved. When the certification is approved, the locking is released, and the electronics 102 become usable.

When the locking of the electronics 102 is released and the electronics 102 become usable, the peculiar information transmitting unit 128 transmits the employee ID number being the peculiar information received from the reading device 105 to the processing device 109 via the communication line 108.

The imaging device 103 includes an imaging unit 132, an image information transmitting unit 133, a storage unit 134, an interface (I/F) 135 and a control unit 136.

In the imaging unit 132, an imaging area is provided in order to shoot the video of the user of the predetermined specific electronics. The storage unit 134 stores the control program and the management number of the imaging device 103. The image information transmitting unit 133 transmits the image information shot by the imaging unit 132 and the management number to the processing device 109 via the communication line 108.

The number of electronics which the imaging device 103 can shoot may be only one. In addition, the imaging area may be provided in order to image the plural electronics.

The processing device 109 includes an input unit 137, a shooting start signal transmitting unit 138, a display unit 139, an interface (I/F) 140, a register unit 141, an image information choosing unit 142, a storage unit 143, a clock unit 144, a certification unit 145, a door locking control unit 146, a control unit 147, an image information database 148, an employee information database 149 and an imaging device information database 150.

The employee ID number which is set for each employee, and information associated with the employee ID number, e.g., the name, the post, the department, the phone number and the company-joining date, are registered in the employee information database 149 as the employee information.

In order to specify the electronics which can be imaged by each of the imaging devices 103, information obtained by associating the management number of each of the imaging devices 103 and the management number of the electronics which can be imaged by each of the imaging devices 103 is registered in the imaging device information database 150.

On receiving the management number of the electronics from the electronics 102 via the communication line 108, the shooting start signal transmitting unit 138 refers to the imaging device information database 150, and specifies the management number of the imaging device 103, associated with the received management number of the electronics and registered, to transmit the instruction signal for starting shooting to the imaging device 103 having the specified management number.

When receiving the instruction signal for starting shooting from the processing device 109 via the communication line 108, the imaging device 103 starts shooting so that the user of the electronics becomes its object.

The register unit 141 associates the employee ID number being the peculiar information received from the electronics 102 via the communication line 108, the image information received from the imaging device 103 via the communication line 108, the clock information and the management number of the imaging device, and registers them in the image information database 148.

Further, based on the employee ID number being the peculiar information received from the electronics 102, the register unit 141 chooses the preset information out of the employee information registered in the employee information database 149, and associates it with the employee ID number to register them in the image information database 148.

In addition, the clock unit 144 of the processing device 109 makes it clear what time the employee ID number being the peculiar information is received from the electronics 102 via the communication line 108. The employee ID number and the image information received from the electronics 102 are registered in the image information database 148 so that the time of receiving of the employee ID number and the imaged time information of the image information received from the electronics 102 coincide with each other. Namely, the employee specified by the employee ID number is seen in the picture imaged at the substantially same time as that of reading the employee ID number in the reading device 105.

FIG. 16 shows an example of the information registered in the image information database 148. As shown in FIG. 16, as the information registered in the image information database 148, the name, the department, the camera number, the camera setting place, the imaged time and the image information, associated with the employee ID number being the peculiar information, are registered. Therefore, when only the picture of the specific employee is chosen and seen, the image information of the employee can be easily displayed and seen on the display unit, based on the employee ID number and the mane being the peculiar information.

Moreover, the certification unit 145 has a function to execute the certification process of the employee ID number being the peculiar information received from the card reader 105*d* used at the time of entering of the room 101. When the certification is approved, the door locking control unit 146 transmits the instruction signal for releasing the locking of the opening/closing door to the locking management device 110 via the communication line 108.

When a reader inputs the employee ID number being the peculiar information from the input unit 137 and displays and sees the image information of the specific employee on the display unit 139, based on the employee ID number inputted by the reader, the image information choosing unit 142 chooses the imaged data associated with the employee ID number registered in the image information database 148 and registered, and displays it on the display unit 139.

As shown in FIG. 15, the card reader 105*d* provided on the outer side of the entrance/exit of the room 101 and the locking management device 110 for managing the locking state of the opening/closing door 107 whose locking is managed are connected to the communication line 108.

The card reader 105*d* includes a transmitting/receiving unit 151, a storage unit 152, a control unit 153 and an interface (I/F) 154. The transmitting/receiving unit 151 receives the employee ID number being the peculiar information from the transmitting/receiving unit 120 of the ID card 104 without contact. The storage unit 152 includes the management number capable of specifying the card reader 105*d* and the control program. The control program is programmed to transmit the employee ID number being the peculiar information received by the transmitting/receiving unit 151 and the management number to the processing device 109 via the communication line 108.

The locking management device 110 includes a locking opening/closing unit 155 for varying the opening/closing state of the opening/closing door 107, a control unit 156 and an interface (I/F) 157. When receiving the instruction signal for releasing the locking of the door from the processing device 109 via the communication line 108, the locking opening/closing unit 155 releases the door locking, which makes it possible for the employee to enter the room. Thereby, it can be prevented that a person having no ID card 104, such as a third person other than employee, enters the room.

Next, a description will be given of the procedure of the image information search system according to this embodiment, with reference to a flow chart shown in FIG. 17.

First, when entering the room from the entrance/exit of the room 101, the user of the electronics 102 such as the personal computer 102*a*, the copy machine 102*b* and the printer 102*c*, provided in the room 101, puts his or her ID card 104 close to the card reader 105*d* provided at the entrance/exit. The card reader 105*d* reads the employee ID number being the peculiar information stored on the ID card 104 (step S101).

The card reader 105*d* transmits the read employee ID number and the management number of the card reader 105*d* to the processing device 109 via the communication line 108 (step S102).

The processing device 109 executes the certification process of the received employee ID number (step S103). In this certification process, it is determined whether or not the received management number, out of the employee information registered in the employee information database 149, is permitted the room entrance. When the certification of the room entrance is permitted, the instruction signal for releasing the locking is transmitted to the locking management device 110 from the processing device 109 via the communication line 108 (step S104). Thereby, the locking of the locking management device 110 is released, and the room entrance from the opening/closing door becomes possible (step S105).

Next, when the person entering the room 101 uses the electronics 102 such as the personal computer 102*a*, the copy machine 102*b* and the printer 102*c*, first, he or she puts his or her ID card 104 close to the reading device 105 provided in the electronics 102. The reading device 105 reads the employee ID number being the peculiar information stored in the ID card 104 (step S106). The employee ID number read by the reading device 105 is transmitted to the electronics 102 (step S107).

The electronics 102 execute the certification process of the employee ID number (step S108). When the certification of the employee ID number is permitted by the certification process in the electronics 102, the employee ID number being the peculiar information and the management number of the electronics 102 are transmitted to the processing device 109 via the communication line 108 (step S109).

On receiving the employee ID number being the peculiar information and the management number of the electronics, based on the received management number, the processing device 109 specifies, from the imaging device information database 150, the imaging device associated with the management number and registered, and transmits a shooting start instruction signal for instruction of starting shooting to the imaging device 103 via the communication line 108 (step S110).

On receiving the shooting start instruction signal from the processing device 109, the imaging device 103 starts shooting so that the user of the electronics 102 is displayed (step S111). The image information shot by the imaging device 103 is transmitted to the processing device 109 via the communication line 108 (step S112). Then, as shown in FIG. 16, the processing device 109 associates the employee information such as the employee ID number being the peculiar information received from the electronics 102, the management number of the imaging device 103, the setting place information, the imaged time information and the image information received from the imaging device 103 with each other, and registers them in the image information database 148 (step S113).

The plural electronics and imaging devices are connected to the communication line 108, and they are also connected to the processing device 109. Thereby, the information is transmitted to the processing device 109 from the plural electronics and imaging devices via the communication line 108, and the employee ID number being the peculiar information and the image information are associated with each other and registered in the image information database 148 of the processing device 109 in order.

Next, a description will be given of a procedure of an investigation on the basis of the image information registered in the image information database 148 of the processing device 109, in a case that the crime with using the electronics occurs, with reference to a flow chart shown in FIG. 18.

First, the employee ID number being the peculiar information of the desired employee is inputted from the input unit 137 of the processing device 109 (step S114). The image information choosing unit 142 of the processing device 109 chooses the image information associated with the inputted employee ID number and registered out of the information registered in the image information database 148 (step S115). Then, the chosen image information is displayed on the display unit 139 of the processing device 109 (step S116).

When plural employee ID numbers of the desired employees are registered in the information registered in the image information database 148, all the picture information associated with the employee ID numbers may be displayed and seen on the display unit 139 after being chosen and extracted to be temporarily stored in the storage unit.

At the time of displaying of the one piece of image information, by displaying the peculiar information and imaged time information registered in the image information database 148, it can be also confirmed when and who uses which electronics, by text information and picture information. Therefore, the picture of the desired object can be efficiently searched and seen in a short time.

Additionally, in a case of a big company having plural business establishments in different places, the reading device of the peculiar information, the electronics, the imaging device and the processing device including the image information database are provided in each business establishment. In this case, the image information shot with using the imaging device is stored in the image information database in each business establishment, and the plural processing devices may be connected to and communicated with each other via the network.

By operating the terminal connected to the network, based on the peculiar information inputted from the terminal, the image information, associated with the peculiar information and stored in each image information database, is chosen out of the image information stored in each image information database provided in the plural business establishments. Then, it becomes possible that the image information chosen via the network is received by the terminal and the image information is displayed and seen on the display of the terminal.

As described above, the image information search system of the present invention may have such a configuration that the plural processing devices 109 are provided; the peculiar information can be received from the electronics 102 including the peculiar information input unit and the display unit, connected to the plural processing devices 109; and the image information can be searched.

In the explanation of the above embodiment, the system is formed so that, in the case of receiving the peculiar information from the electronics 102, the processing device 109 transmits the instruction signal for starting shooting to the imaging device 103. In another manner, the system may be formed so that, in the case of receiving the peculiar information from the electronics 102, the processing device 109 starts shooting.

In this case, a shooting start signal transmitting unit 138 is provided in the electronics 102, and the shooting start signal is directly transmitted to the imaging device 109 from the electronics 102. Thereby, the imaging by the imaging unit 132 of the imaging device 109 is started.

The shooting start signal may be the peculiar information.

In addition, when a card reader/writer is used instead of the card readers 105*a*, 105*b* and 105*c*, the management information of the electronics and the time information can be stored on the ID card from the reader/writer at the time of reading of the peculiar information from the ID card 104.

Further, the image information database 148 may be also provided in a storage device, such as a server, connected to and communicating with the processing device 109 via the network. The database which is not integrated inside the processing device as hardware is included in the present invention.

In the above embodiment, for the purpose of easily understandable explanation of the present invention, such a case that the electronics, the imaging device and the processing device are realized as separate devices is explained. But these devices may be integrated with each other as hardware. Needless to say, the present invention includes such a configuration that the electronics and the imaging device are integrated with each other, and such a configuration that the imaging device and the processing device are integrated with each other, for example.

INDUSTRIAL APPLICABILITY

The present invention is usable for various kinds of image information management systems including a room entrance/leaving management system with using an imaging device such as a security camera, a delivery management system of materials and an entrance detection system of a suspicious individual.

The invention claimed is:
1. An image information search system comprising:
a storage medium on which identification information capable of specifying a user is stored;
reading devices each of which reads the identification information stored on the storage medium;
a plurality of electronic devices each of which is connected to the reading device and receives the identification information read by the reading device;
one or more imaging device which shoots a video of the user of one or more of the electronic devices; and
a processing device which is connected to the electronic devices and the imaging device,
wherein the electronic device includes a unit which transmits, to the processing device, the identification information received from the reading device and a management number of the electronic device,
wherein the imaging device includes a unit which transmits the image information to the processing device, and
wherein the processing device includes:
an imaging device information database which associates and stores the management number of the electronic device and the management number of the imaging device used to image the associated electronic device;
a transmitting unit which receives the identification information and the management number of the electronic device from the electronic device, specifies the imaging device associated with the received management number of the electronic device by referring to the imaging device information database, and transmits an instruction signal to start shooting by the imaging device thus specified;

an image information database which associates and stores the image information received from the specified imaging device, the identification information received from the electronic device and the management number of the specified imaging device in association with each other; and a choosing unit which chooses the image information associated with the identification information and stored in the image information database, based on inputted identification information, when specific image information is chosen from the image information stored in the image information database.

2. The image information search system according to claim 1, wherein the processing device includes:

a display unit which displays the image information stored in the image information database; and an input unit which receives an input of the identification information.

3. The image information search system according to claim 1, wherein the processing device receives the identification information from the electronic device that is connected to the processing device and that includes an identification information input unit and a display unit, and searches the image information based on the received identification information.

4. The image information search system according to claim 1, comprising a plurality of processing devices, wherein each of the processing devices receives the identification information from the electronic device that is connected to the processing device and that includes an identification information input unit and a display unit, and searches the image information based on the received identification information.

5. The image information search system according to claim 1, wherein at least one of the imaging devices is arranged to shoot the video of the user of plural electronic devices, and wherein, in the imaging device information database, the management number of the at least one of the imaging devices is associated with the management numbers of the plural electronic devices.

6. The image information search system according to claim 1, wherein one or more electronic devices and one imaging device are arranged in each of a plurality of rooms.

* * * * *